(12) United States Patent
Leva et al.

(10) Patent No.: US 6,442,199 B1
(45) Date of Patent: Aug. 27, 2002

(54) STABILIZING THE OPERATION OF FRACTIONALLY SPACED EQUALIZERS IN DIGITAL SIGNAL RECEIVERS

(75) Inventors: Angelo Leva, Uboldo; Roberto Della Chiesa, Milan, both of (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/156,140

(22) Filed: Sep. 17, 1998

(30) Foreign Application Priority Data

Sep. 19, 1997 (IT) ........................... TO97A0830

(51) Int. Cl.$^7$ ................................. H03H 7/30
(52) U.S. Cl. .......................................... 375/234
(58) Field of Search ....................... 375/234, 232, 375/350, 230, 229; 708/322, 323; 333/18, 28 R (56) References Cited

U.S. PATENT DOCUMENTS

| 4,237,554 A | * 12/1980 | Gitlin et al. | 375/234 |
| 4,575,857 A | * 3/1986 | Murakami | 375/232 |
| 6,240,134 B1 | * 5/2001 | Sandri et al. | 375/234 |

FOREIGN PATENT DOCUMENTS

| EP | 0534489 | 3/1993 |
| EP | 0729254 | 8/1996 |

OTHER PUBLICATIONS

"The Tap–Leakage Algorithm: An Algorithm for the Stable Operation of a Digitally Implemented Fractionally Spaced Equalizer", Bell Sys. Tech. J. vol. 61, No. 8, pp. 1817–1839 10/82 by Gitlin.

"A 60–Mbaud Adaptive Transversal Equalizer in 1.0 $\mu$M CMOS for QAM Digital Modems" by Lu & Samueli, IEEE 1993–Customer Int.Circuits Conference, pub. Sep. 5, 1993, p. 16.6.1–16.6.4.

\* cited by examiner

*Primary Examiner*—Betsy L. Deppe
(74) *Attorney, Agent, or Firm*—Sughrue Mion, PLLC (57) ABSTRACT

A method and/or system for stabilizing the operation of fractionally spaced equalizers has a number of taps (P), associated with which are respective equalization coefficients ($c_{-L}, \ldots, c_L$), used in digital signal receivers, wherein the equalization coefficients ($c_{-L}, \ldots, c_L$) are updatable to an algorithm (1) based on the minimization of a proper cost function (J) and stabilized for operation through a proper a modification (I) involving calculation of a plurality of values ($I_i$) to be considered in updating the equalization coefficients ($c_{-L}, \ldots, c_L$). According to the invention, these values ($I_i$) are calculated in only one circuit (COMP) and serially transmitted to the fractionally spaced equalizer (FSE).

11 Claims, 4 Drawing Sheets

STABILIZING THE OPERATION OF FRACTIONALLY SPACED EQUALIZERS IN DIGITAL SIGNAL RECEIVERS

TECHNICAL FIELD

This invention refers to a method for stabilizing the operation of fractionally spaced equalizers having a determinate number of taps, associated with which are respective equalization coefficients, used in digital signal receivers, said equalization coefficients being updatable through an algorithm based on the minimization of a proper cost function and stabilized by a proper modification, said modification involving evaluation of a plurality of values to be considered for updating said equalization coefficients.

The invention also concerns a fractionally spaced equalizer and a digital signal receiver incorporating the method.

BACKGROUND OF THE INVENTION

Adaptive equalization is a technique commonly used to compensate the channel distorting effect in a general transmission system. A known technique uses synchronous equalizers obtained through FIR (Finite Impulse Response) filters with variable coefficients time-spaced by an amount equal to the signal interval or to the symbol time.

Performance of such an equalizer depends significantly on the phrase of the symbol synchronism reconstructed during reception. Improved performance can be obtained with the use of the so-called fractionally spaced equalizers (FSE) consisting of an adaptive FIR filter with coefficients time-spaced by a quantity equal to a fraction of the signal interval or to the symbol time. Performance of the fractionally spaced equalizer with a sufficient number of coefficients is practically free from the phrase characteristics of the transmission channel and from the phrase of the symbol synchronism as reconstructed during reception. In a more general way, the fractionally spaced equalizer is able to execute adaptively in only one device both the adaptive filtering and equalization functions, and provide, for instance, the optimum linear receiver. However, a fractionally spaced equalizer has two main drawbacks: first of all the coefficients drift and, secondly, has a low convergence rate. Both these drawbacks are due to the fact that a fractionally spaced equalizer in general allows more configurations than the equalization coefficients, substantially corresponding to the same root-mean-square error. In other words, the root-mean-square error does not change significantly according to certain directions around the point corresponding to the optimum configuration point of the equalization coefficients. Experimental tests have demonstrated that a fractionally spaced equalizer is affected by a long term intrinsic instability due to unavoidable bias taking place in the control circuits. This behaviour leads the equalizer to operate with coefficients having values so high as to cause overflow in the registers or a coefficient saturation, leading to a performance degradation.

Therefore, proper stabilization techniques of the control algorithms are required to maximize the performance of a fractionally spaced equalizer, to prevent the coefficient drift and to increase convergence rate. To this purpose it has been proposed, for instance in the article by R. D. Gitlin, H. C. Meadors, S. B. Weinstein, '*The Tap-Leakage Algorithm: An Algorithm for the Stable Operation of a Digitally Implemented Fractionally Spaced Equalizer*', Bell Sys. Tech. J., vol. 61, no. 8, pp. 1817–1839, Oct. 1982, to change the control algorithm of the fractionally spaced equalizer introducing a predetermined quantity of fictitious white noise. This technique, called 'tap-leakage', represents an efficient measure against the drift of equalization coefficients while improving convergence rate.

Namely, if $c^k$ is the vector of the equalization coefficients at time k and $c^{k+1}$ the vector of the equalization coefficients at time k+1, where time increment corresponds to an updating interval, then the updating operation according to the algorithm of the stochastic gradient will be:

$$c^{k+1}=c^k-\gamma(e_k r_k^* + \mu Q c) \quad (1)$$

where $\gamma$ is a step chosen as a function of the convergence rate to be obtained, $\mu$ is a white noise constant, Q is a shaping matrix of the fictitious noise, whereas $r_k^*$ is the vector of the samples at the equalizer input, and $e_k$ is an error in a sequence of errors $e_{k-1}, e_k, e_{k+1}, \ldots$ evaluated according to a certain cost function J among the equalized samples and recognized values.

The cost function J to be minimized can be e.g.:

$$J=E\{|x(kT)-\hat{a}_k|^2\} \quad (1a)$$

where the symbol E{.} shows the mean value operation and $\hat{a}_k$ is the recognized signal. Therefore, the cost function J is the mean value of the root-mean-square deviation between the equalized value and the recognized value.

Thus, according to equation (1) the value of the updated equalization coefficients $c^{k+1}$ depends on the product $e_k r_k^*$, that is the updating value, as well as on the product $\mu Q c^k$, which determines a vector $I^{k+1}$ which is called of the leakage values, i.e. loss values. It will be in fact:

$$I^{k+1}=\mu Q c^k \quad (2)$$

Figure 2:
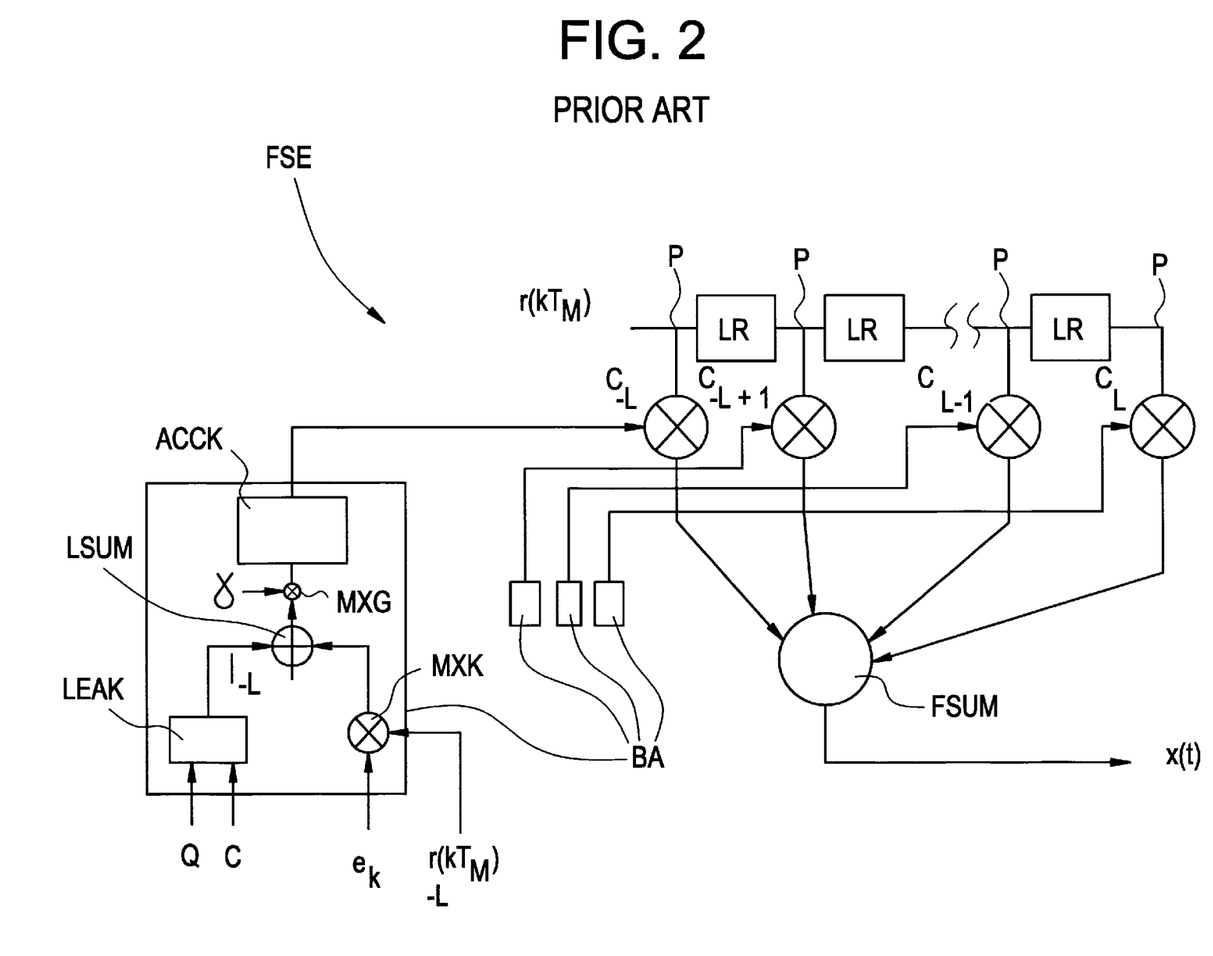
FIG. 2 shows a detail of both the system and method for stabilizing the operation of fractionally spaced equalizers according to FIG. 1.

Substantially, the function of the leakage value vector $I^{k+1}$ is to behave like an additional term controlling the value of the coefficients $c^{k+1}$ at every update, so as to avoid their divergence in the long term. The fictitious white noise shaping matrix is a $(2L+1)\times(2L+1)$-element square matrix, and, as is well known in the art, is a Toeplitz-type matrix (see U.S. Pat. No. 5,444,816), having in all only 2N+1 different non-zero values, for some N<L, with some rows having more non-zero values than others, and the non-zero values being centered on the diagonal, corresponding the number of coefficients of the fictitious noise filter to be implemented. (For the definition of a Toeplitz matrix, see e.g. S. Haykin, *Adaptive Filter Theory*, Prentice-Hall, Englewood Cliffs, page 48.) For N=2, the multiplication indicated in FIG. 2 is as follows;

$$\begin{vmatrix} I_{-5} \\ I_{-4} \\ I_{-3} \\ I_{-2} \\ I_{-1} \\ I_0 \\ I_1 \\ I_2 \\ I_3 \\ I_4 \\ I_5 \end{vmatrix} = \mu \begin{vmatrix} q_0 & q_1 & q_2 & q_3 & 0 & 0 & 0 & 0 & 0 & 0 & 0 \\ q_{-1} & q_0 & q_1 & q_2 & q_3 & 0 & 0 & 0 & 0 & 0 & 0 \\ q_{-2} & q_{-1} & q_0 & q_1 & q_2 & q_3 & 0 & 0 & 0 & 0 & 0 \\ q_{-3} & q_{-2} & q_{-1} & q_0 & q_1 & q_2 & q_3 & 0 & 0 & 0 & 0 \\ 0 & q_{-3} & q_{-2} & q_{-1} & q_0 & q_1 & q_2 & q_3 & 0 & 0 & 0 \\ 0 & 0 & q_{-3} & q_{-2} & q_{-1} & q_0 & q_1 & q_2 & q_3 & 0 & 0 \\ 0 & 0 & 0 & q_{-3} & q_{-2} & q_{-1} & q_0 & q_1 & q_2 & q_3 & 0 \\ 0 & 0 & 0 & 0 & q_{-3} & q_{-2} & q_{-1} & q_0 & q_1 & q_2 & q_3 \\ 0 & 0 & 0 & 0 & 0 & q_{-3} & q_{-2} & q_{-1} & q_0 & q_1 & q_2 \\ 0 & 0 & 0 & 0 & 0 & 0 & q_{-3} & q_{-2} & q_{-1} & q_0 & q_1 \\ 0 & 0 & 0 & 0 & 0 & 0 & 0 & q_{-3} & q_{-2} & q_{-1} & q_0 \end{vmatrix} \times \begin{vmatrix} c_{-5} \\ c_{-4} \\ c_{-3} \\ c_{-2} \\ c_{-1} \\ c_0 \\ c_1 \\ c_2 \\ c_3 \\ c_4 \\ c_5 \end{vmatrix}$$

where the k dependence (indicating a instant of time) expressly indicated in eq. 2 has here been suppressed.

At present, for every equalization coefficient $c_i^{k+1}$ it is known to calculate also its associated leakage value $I_i^{k+1}$ at the same instant, independently from the other leakage values. Now, this involves the use of a large number of circuits to calculate each leakage value $I_i^{k+1}$ at the same instant. Moreover, the calculated leakage values $I_i^{k+1}$ are always relative to the same time instant k preceeding that where equalization coefficients are updated.

The present invention seeks to overcome the above-mentioned drawbacks and provide both a method for stabilizing the operation of fractionally spaced equalizers and a system for stabilizing the operation of fractionally spaced equalizers, whose execution is improved, better performing and more cost effective as compared with the known solutions.

SUMMARY OF THE INVENTION

In this frame, it is the main object of the present invention to provide a method for stabilizing the operation of fractionally spaced equalizers involving a reduced total number of operations for updating the leakage value and, therefore, the equalization coefficients of an adaptive fractionally spaced equalizer.

A further object of the present invention is to provide a method for stabilizing the operation of fractionally spaced equalizers wherein the leakage value calculation function is concentrated on one functional block alone.

A further object of the present invention is to provide a method for stabilizing the operation of fractionally spaced equalizers to be implemented with a lower circuit complexity and resulting smaller area on the integrated circuit, cost-effective manufacture and lower power consumption.

A further object of the present invention is to provide a fractionally spaced equalizer designed to implement the improved method for stabilizing its operation. A further object of the present invention is to provide a digital signal receiver incorporating the above fractionally spaced equalizer.

To achieve the above objects, the present invention seeks to provide a method for stabilizing the operation of fractionally spaced equalizers, a fractionally spaced equalizer and a digital signal receiver incorporating the characteristics of the disclosed method.

BRIEF DESCRIPTION OF THE DRAWINGS

Further objects, characteristics and advantages of the present invention will be apparent from the following detailed description and annexed drawings, which are only supplied by way of a non-limiting example, wherein.

BEST MODE FOR CARRYING OUT THE INVENTION

Figure 1:
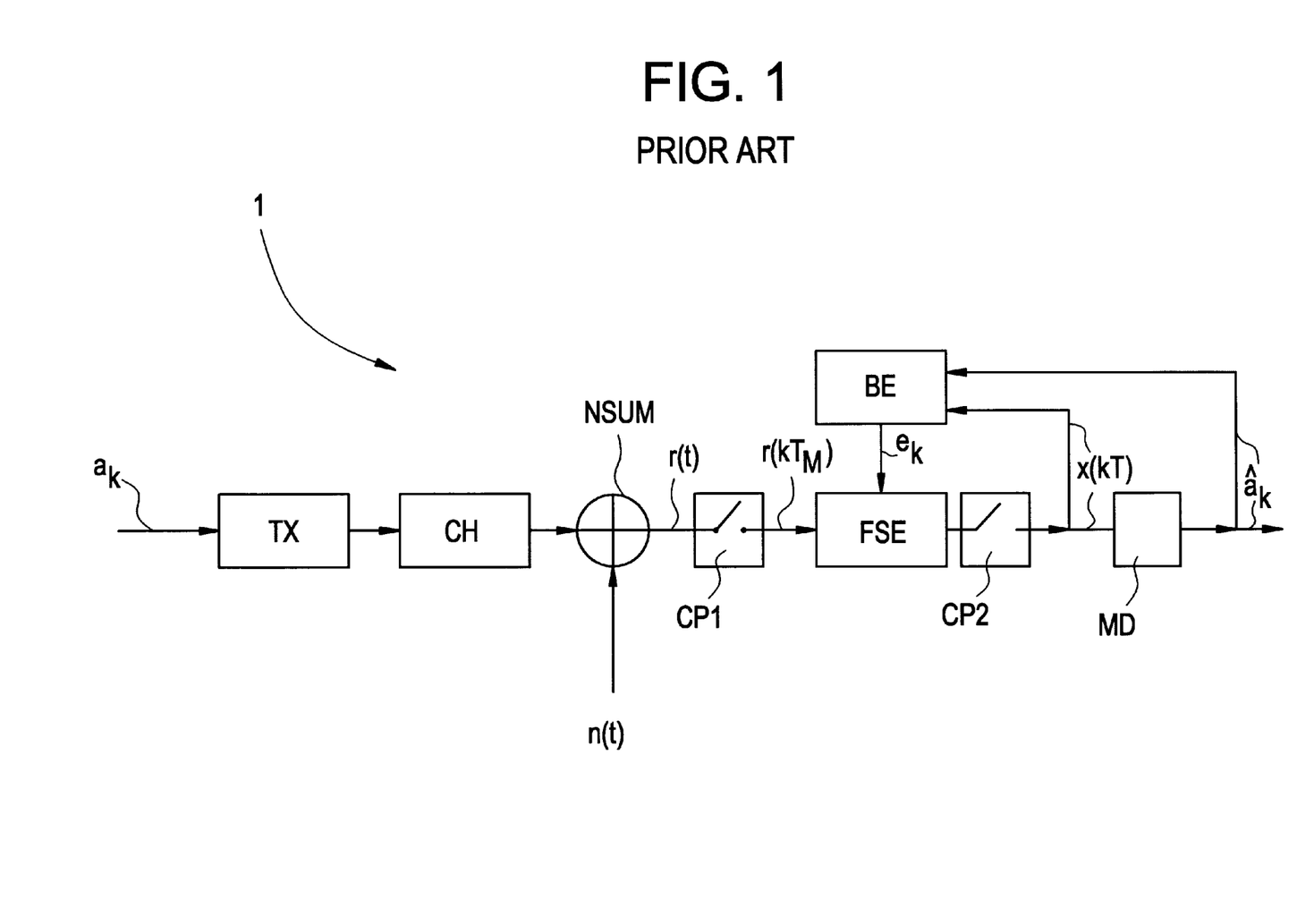
FIG. 1 shows a schematic block diagram of an implementation of both a method for stabilizing the operation of fractionally spaced equalizers and system for stabilizing the operation of fractionally spaced equalizers according to the known art.

FIG. 1 shows a schematic block diagram of a standard digital transmission system according to the known art, where an adaptive fractionally spaced equalizer FSE is used.

This transmission system 1 is provided with a data signal $a_k$, forming the numerical sequence to be transmitted at the time k, which is fed to the input of a transmitter circuit TX. The transmitter circuit TX sends the data signal $a_k$, associated with which is a certain symbol period T, over a transmission channel CH. Due to its own nature, said transmission channel CH introduces interferences of various kind in the data signal $a_k$. A summing block NSUM represents the physical event of introducing a Gaussian white noise n(t), that will sum up at the output from channel CH, thus causing an output signal r(t).

The signal r(t) on the receiving side enters the fractionally spaced equalizer FSE and in particular, at first, a sampler CP1, which samples the output signal r(t) according to an period $T_M$ equal to the period T divided by a factor M, where for instance M can be worth 2, thus producing a sampled signal $r(kT_M)$. The sampled signal $r(kT_M)$ is then passed through the adaptive fractionally spaced equalizer FSE, which will output—after passing through a second sampler circuit CP2 operating according to the period T—an equalized signal x(kT) according to a vector $c^k$ of the equalization coefficients, associated with the fractionally spaced equalizer FSE. The vector $c^k$ of the equalization coefficients is the vector at time k, whereas its components are equalization coefficients $c_i^k$ at time k. Then, the equalized signal x(kT) is finally handled by a decision block MD, that may consist of a simple integrator, which outputs a recognized signal $â_k$.

However, the equalized signal x(kT) and the recognized signal $\hat{a}_k$ are also picked up and sent to an error calculation block BE. Said error calculation block BE outputs an error signal $e_k$, of the type identified by the above equation (1a), which is used by the adaptive fractionally spaced equalizer FSE to update the vector $c^k$ of the equalization coefficients at instant k in a vector $c^{k+1}$ of the equalization coefficients at instant k+1. The error calculation block BE produces an error signal $e_k$, which is a sequence of errors calculated for each symbol of the sequences forming the equalized signal x (kT) and the recognized signal $\hat{a}_k$; for instance, it is calculated according to the known algorithm of the minimum root-mean-square error (MMSE), i.e. minimizing the cost function described in the previous equation (1a).

FIG. 2 shows a schematic block diagram of the fractionally spaced equalizer FSE illustrated in FIG. 1. The fractionally spaced equalizer FSE comprises 2L+1 delay taps P, obtained by interposing corresponding delay lines LR, where L is an integer, which select 2L+1 symbols of the signal $r(kT_M)$ spaced apart by the time interval $T_M$, and send them to a summing block FSUM after multiplying them by some equalization coefficients $c^k_{-L}, c^k_{-L+1}, \ldots, c^k_{L-1}, c^k_L$ of the vector $c^{k+1}$ of equalization coefficients. Therefore, the equalized signal x (kT) is supplied as output.

Equalization coefficients $c^k_{-L}, c^k_{-L+1}, \ldots, c^k_{L-1}, c^k_L$ come from respective update blocks BA, that receive at the input the error signal $e_k$ and have inside a computation block LEAK that calculates the values $I_i^{k+1}$ of a leakage vector $I^{k+1}$, as expressed in the above equations (1) and (2). A multiplier block MXK executes, on the other hand, the product of the error signal $e_k$ and the signal $r(kT_M)$, to be added to the values $I_i^{k+1}$ of the leakage vector $I^{k+1}$ in a summing block LSUM. An accumulator block ACCK is also provided to complete the operations between the vectors following multiplication by a proper step value γ in a further multiplier MXG. The values $I_i^{k+1}$ of the leakage vector $I^{k+1}$ are dependent on a shaping matrix of the fictitious white noise Q, appearing at the input of the computation block LEAK. The shaping matrix of the white noise Q is represented by 2N+1 values $q_{-N} \ldots q_N$, where N is an integer, corresponding to the number of coefficients of the noise filter to be implemented, according to the above equation (1).

Updating operations generally take place within an updating time TA, which may be equal to $T_M$. Thus, the vector $c^{k+1}$ of the equalization coefficients is updated through the vector $c^k$ of the equalization coefficients that temporally preceeds it by the updating time TA.

Figure 3:
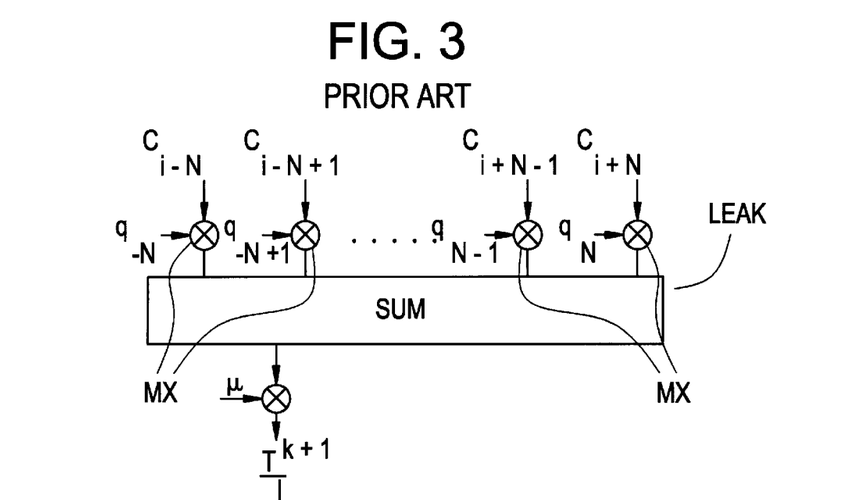
FIG. 3 shows a second detail of both the system and method for stabilizing the operation of fractionally spaced equalizers according to FIG. 1.

FIG. 3 shows a schematic block diagram of the computation block LEAK, which calculates a value of the leakage vector, $I_i^{k+1}$.

As it can be seen, each value of the leakage vector $I^{k+1}$ is calculated by multiplying, at proper multiplier means MS, a corresponding set of values, namely all or some of $q_{-N} \ldots q_N$ (depending on the component of $I^{k+1}$ being calculated), of the shaping matrix Q by a respective set of equalization coefficients $c^k_{i-N} \ldots c^k_{i+N}$. Thus, 2N+1 values are obtained, which are summed up by a summation block SUM to give the value $I_i^{k+1}$ (after multiplication by the constant μ) of the leakage vector $I^{k+1}$. The computation block LEAK is contained in each one of the 2L+1 updating blocks BA which, therefore, are so many as the delay tape P of the fractionally spaced equalizer FSE. Therefore, calculation of each value $I_i^{k+1}$, (there are 2L+1 of them to be calculated, corresponding to the number of delay taps P), requires prearrangement of 2N+1 multiplier circuits MX, according to the number of values of the shaping matrix Q and a summing block SUM.

Moreover, each updating block BA shall receive at its input the whole vector $c^k$ of the equalization coefficients to be sent to the computation block LEAK contained therein, introducing 2L+1 connections, such as metal tracks or wires for each updating block BA.

Therefore, it can be seen how the implementation of the calculation of the vector $I^{k+1}$ of the leakage values is rather complex and requires a high expenditure of circuit resources.

Figure 4:
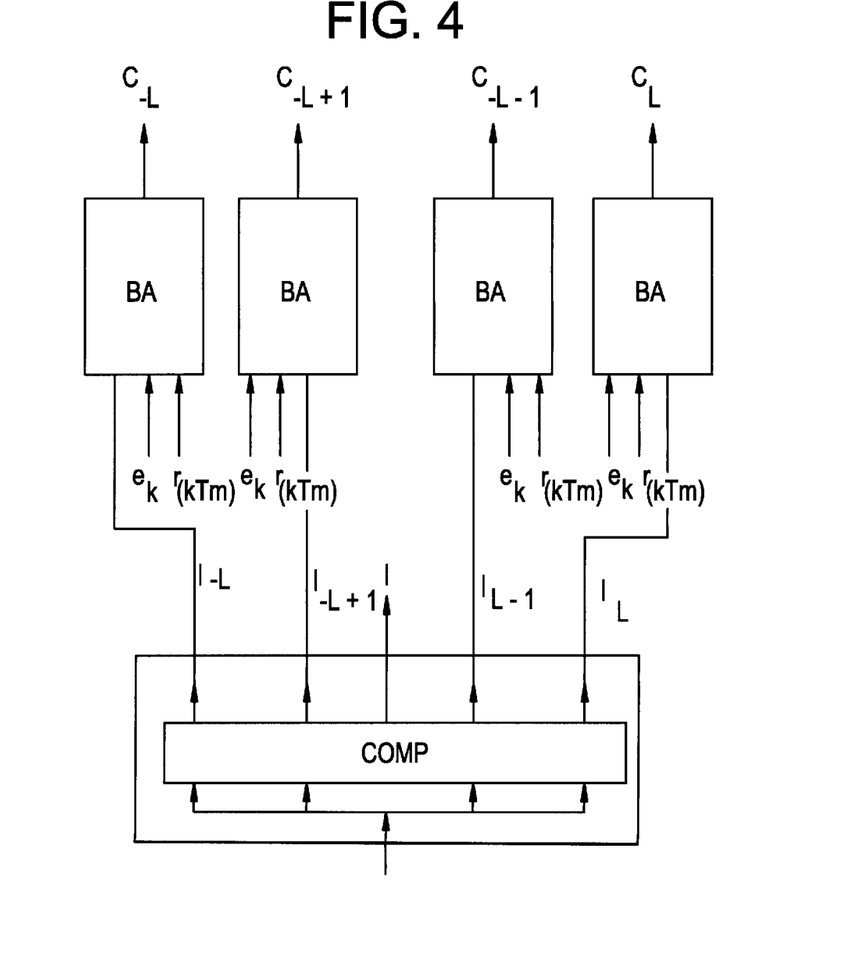
FIG. 4 shows a schematic block diagram of a realization of both a system and a method for stabilizing the operation of fractionally spaced equalizers according to the invention.

FIG. 4 shows a schematic block diagram of a processor block COMP according to the invention, capable of replacing the 2L+1 computation blocks LEAK represented in FIGS. 2 and 3 and concentrating their functions.

In said diagram the processor block COMP receives at its input a vector c of the equalization coefficients, which is formed in fact by its 2L+1 equalization coefficients $c_{-L}, \ldots, c_L$. By removing the apex it is indicated that the vector c of the equalization coefficients is not considered by the processor block COMP at a given instant to cause its output. The processor block COMP outputs the values $I_i$ of the leakage vector I to some updating blocks BA', which differ from updating blocks BA of FIG. 2 simply because they have no computation blocks LEAK. Where the updating block BA was provided with inputs for the fictitious white noise shaping matrix Q and for the vector c of the equalization coefficients, the updating block BA' will receive the corresponding value $I_i$ of the leakage vector I directly, which directly reaches the adder LSUM shown in FIG. 2.

However, said values $I_i$ of the leakage vector I are not supplied at the instant k+1, as in the computation block LEAK shown in FIG. 2, but they are available at every instant and sequentially updated, executing an updating sequence within a time interval DT that is worth (2L+1)(2N+1) times the updating interval TA.

Time interval DT is the total updating interval spent by the process block COMP to provide updating of a value $I_i$ of the leakage vector I for use in the corresponding update block BA to update the vector c of the equalization coefficients according to equation (1). In reality, both k and k+1 lose significance with respect to equation (1) since leakage vector I is updated by sequentially changing each one of its values $I_i$ at every subsequent instant, and variable leakage vector I is available at the input of the updating blocks BA at every instant for the evaluation of the vector c of the equalization coefficients, therefore, it follows that the same vector c of the equalization coefficients is again input to the processor block COMP according to the changes of the leakage vector I.

Figure 5:
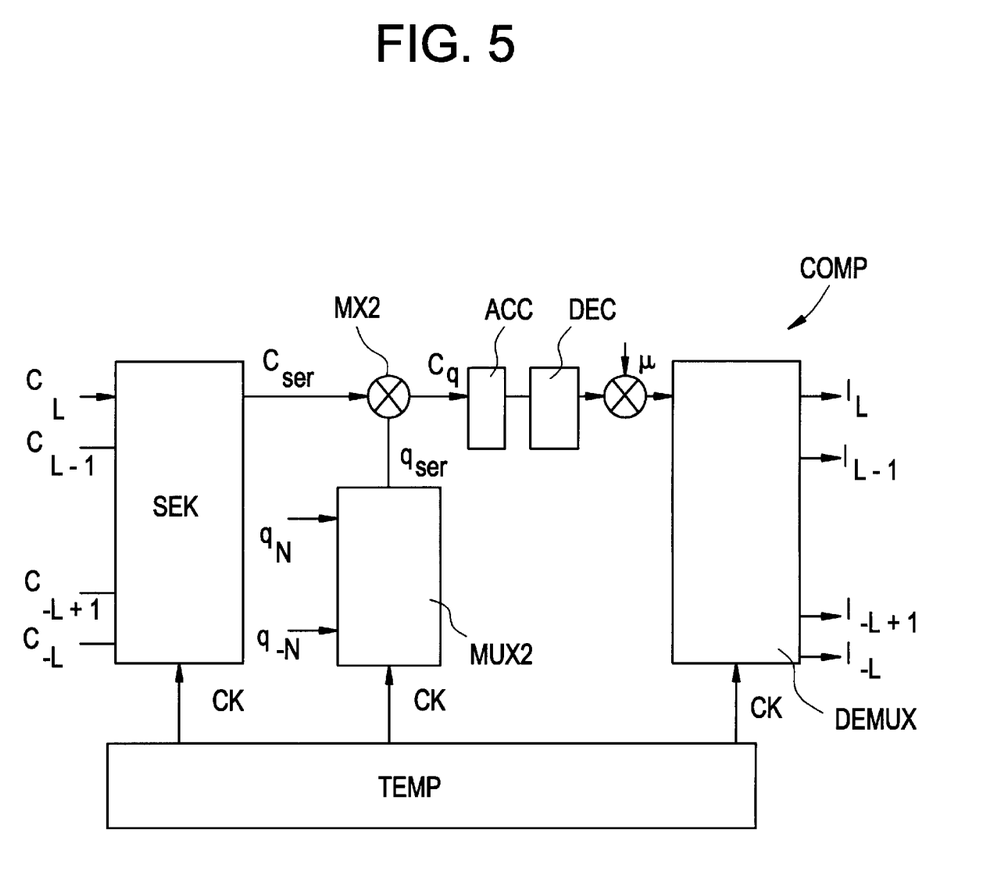
FIG. 5 shows a detail of both system and method for stabilizing the operation of fractionally spaced equalizers according to FIG. 4.

FIG. 5 represents a schematic block diagram of the processor block COMP, consisting of a selector circuit SEL, which receives the vector c of the equalization coefficients at its input.

More in detail, the selector circuit SEL will select, from the set of equalization coefficients $c_{-L}, \ldots c_L$ available at its inputs, a subset of all or some equalization coefficients $c_{i-N}, \ldots, c_{i+N}$ and output them serially in a serial signal $c_{ser}$ to a multiplier MX2 through a multiplexing operation. (Only equalization coefficients $c_j$ for which the subscript j is in the range −L to +L are defined and used.)

For instance, in the case where N=3, there are selected 7, i.e. (2*3)+1 $c_{ser}$ among the equalization coefficients $c_{-L} \ldots c_L$, and serialized in the serial signal. Thus, the selector circuit SEL will select a further subset of equalization coefficients $c^k_{i-N}, c^k_{i+N}$, incrementing index i by one. Iteration goes on so as to serialize all subsets of equalization coefficients $c^k_{i-N}, c^k_{i+N}$.

A second multiplexer MUX2 receives at its input the coefficients $q_{-N} \ldots q_N$ of the shaping matrix Q and transmits them serially in a signal $q_{ser}$ to the multiplier MX2.

A timing block TEMP is provided for clock reference CK, i.e. a clock signal, to the selector circuit SEL and to the multiplexer MUX2, as well as to a demultiplexer DEMUX.

Thus, multiplier MX2 outputs a serial signal $c_q$, which is sent to an accumulator block ACC. Said accumulator block ACC is then followed by a decimation circuit DEC. Said accumulator block ACC accumulates 2N+1 values of the serial signal $c_q$, adds them and sends them to the demultiplexer DEMUX through the decimation circuit DEC.

The function of decimation circuit DEC is to let only the sum of the 2N+1 values of the serial signal $c_q$ reach the demultiplexer DEMUX and not the intermediate results.

The demultiplexer DEMUX has 2L+1 outputs, each corresponding to a value $I_i$ of the leakage vector I. The demultiplexer DEMUX distributes the values received from the accumulator block ACC in a cyclic and sequential manner over the 2L+1 outputs, completing the leakage vector I in the time interval DT. Values $I_i$ of the leakage vector I at each one of the 2L+1 outputs of the demultiplexer DEMUX are maintained constant during the time interval DT, provided they are not updated by the demultiplexer DEMUX.

In order to clarify by way of example, with reference to FIG. 5 and with N=3 and L=9, the processor block COMP picks up at its input through the selector circuit SEL, seven coefficients $c_2$ to $c_8$ and serializes them in the signal $c_{ser}$. Similarly, the multiplexer MUX2 picks up the 7 coefficients $q_{-3}$ to $q_{+3}$ of the fictitious white noise shaping matrix Q and serializes them in the signal $q_{ser}$. Multiplication of the signal $c_{ser}$ and the signal $q_{ser}$ is executed at the multiplier MX2, so that the resulting sill $c_q$ will consist of the series $c_2q_{-3}, c_3q_{-2}, c_4q_{-1}, \ldots c_8q_3$. through a multiplexing operation. Therefore the accumulator ACC will produce the sum $c_2q_{-3}+c_3q_{-2}+c_4q_{-1}+ \ldots +c_8q_3$.

The function of the decimation circuit DEC is to pick up the accumulator result only every 7 operations, i.e. only the final sum, preventing partial sums $c_2q_{-3}$. $C_2q_{-3}+c_3q_{-2}, c_2q_{-3}+c_3q_{-2}+c_4q_1$ from reaching the input of the demultiplexer DEMUX and so on. The final sum thus obtained is sent by the demultiplexer DEMUX for the updating of the coefficient of the pertaining vector I, namely $I_5$. Subsequently, the selector circuit SEL will choose seven coefficients $C_3$ to $c_9$ and serialize them in the signal $c_{ser}$, repeating the procedure till the value $I_6$ is obtained.

Then the processor block COMP updates the vector c of the equalization coefficients in a time interval DT that is (2L+1)(2N+1) times that of the computation block LEAK. However, this occurs through a proper choice of number N and number L, choosing e.g. N=3 and L=9, so that the time interval DT is equal to 133 times the elementary updating time TA and does not cause a significant performance decrement of the fractionally spaced equalizer FSE.

For the calculation of all leakage values $I_i$, only one processor block COMP is provided, comprising essentially only a selector circuit SEL and a multiplexer MUX2, a multiplier MX2, an accumulator ACC, a decimation circuit DEC and a demultiplexer DEMUX instead of (2N+1)(2L+1) multipliers MX and (2L+1) adders SUM of the computation block LEAK of FIG. 2.

Thus, from FIGS. 4 and 5 both a system and method for stabilizing the operation of the fractionally spaced equalizer FSE are described, wherein the calculation function of the leakage vector I is concentrated in a sole circuit, i.e. processor block COMP, external to the updating blocks BA', whereas previously such a calculation function was assigned to the computation block LEAK inside each updating block BA.

Therefore, the method of stabilizing the operation of the fractionally spaced equalizer FSE according to the present invention consists essentially of the following steps:
a) transmission of the coefficient vector c to the processor block COMP;
b) serialization of the i-th subset $C_{i-N}, C_{i+N}$ of the equalization coefficients $c_{-L}, \ldots, c_L$ in a signal $c_{ser}$ through the selector circuit SEL;
c) serialization of the coefficients $q_{-N}, q_N$ of the fictitious white noise shaping matrix Q in a signal $q_{ser}$ through the multiplexer MUX2;
d) product of signals $c_{ser}$ and $q_{ser}$ in a signal $c_q$ through the multiplier MX2;
e) summation of 2N+1 values of the signal $c_q$ through accumulator ACC and decimation circuit DEC to obtain the value $I_i$ of the leakage vector I;
f) transmission of value $I_i$ of the leakage vector I through a demultiplexer DEMUX on one among 2L+1 outputs connected with the two 2L+1 updating blocks BA';
g) updating of the index i and repeat steps b) to g), with $-L \leq i \leq L$.

It should be noticed that according to said method the vector c of the equalization coefficients coming into the processor block COMP changes with every iteration, whereas at the processor block output corresponding to the 2L+1 outputs of the demultiplexer DEMUX, each value $I_i$ is maintained on its last value if it is not its turn to be updated. The value $I_i$ at an output of the demultiplexer DEMUX changes at every time interval DT only. Therefore, the leakage vector I will be fully updated within the time interval DT, although at the end of said time time interval DT the new leakage vector I is not really the result of the vector c of the equalization coefficients considered after the time interval DT, but rather during said time interval DT.

Therefore, the method for stabilizing the operation of fractionally spaced equalizers as described herein supplies the values $I_i$ of the leakage vector I serially to the updating blocks BA'. The demultiplexer DEMUX simply fulfils the function of sending to each updating block BA' through the decimation circuit DEC the values $I_i$ reaching it serially at a time interval substantially equal to DT/(2L+1).

Therefore, the characteristics of the present invention as well as its advantages result are clear from the above description.

The system and method for stabilizing the operation of fractionally spaced equalizers according to the invention allow the reduction of the circuit complexity of the fractionally spaced equalizer, since instead of introducing (2L+1) adders, i.e. one for each equalizer tap and, above all, instead of having to provide connections to send the values of the equalization coefficients and coefficients of the fictitious white noise shaping matrix to the 2L+1 update blocks, only one circuit is used, with only one input for the equalization coefficients and the coefficients of the fictitious white noise shaping matrix acting on all equalizer taps.

As a result, the method and/or system for stabilizing the operation of the fractionally spaced equalizers according to the invention advantageously allow a space saving in the integrated circuit executions.

Moreover, said method and/or system for stabilizing the operation of the fractionally spaced equalizers imply a lower manufacturing cost, since the circuits suitable to implement it are not only less as compared with the known art, but their manufacture is also cost-effective and simple.

Moreover, the method and/or system for stabilizing the operation of the fractionally spaced equalizers according to the invention advantageously allow a power consumption saving due to a reduced circuit complexity and a longer time interval required to update leakage values.

It is obvious that many changes are possible, for a person skilled in the art, to the method for stabilizing the operation of fractionally spaced equalizers described above by way of example, without departing from the novelty concepts of the basic idea, and as well as it is clear that in carrying it into effect the components shown may often differ in form and size from the ones described and be replaced by technical equivalent elements.

Specifically, the circuit shapes adopted for the implementation of the stabilizing method and through which the leakage vector is updated in a serial manner during a time interval bound to the number of equalizer taps, may be different.

Moreover, the use of various mathematical algorithms will be possible for error evaluation, including the method of the minimum root-mean-square error (MMSE) or Godard's constant module algorithm, as well as the use of adaptive algorithms of the equalization coefficients differing from the method of the stochastic gradient, but requiring error evaluation and error correction.

The number of delay taps, indicated conventionally with the odd number 2L+1, can also be even.

What is claimed is:

1. A method for stabilizing the operation of a fractionally spaced equalizer, having a number of taps (P) associated with respective equalization coefficients ($c_{-L}, \ldots, c_L$), used in digital signal receivers, comprising the steps of:

updating said equalization coefficients ($c_{-L}, \ldots, c_L$) via an algorithm $$c^{k+1} = c^k - \gamma(e_k r_k^* + \mu Q c^k),$$

based on minimization of a proper cost function J of equalized samples and recognized values, wherein $c^{k+1}$ and $c^k$, with superscripts k+1 and k respectively, are each vectors having said equalization coefficients ($c_{-L}, \ldots c_L$) as components but at different instants of time as indicated by the superscripts k+1 and k, $\gamma$ is a step chosen as a function of convergence rate, $r_k^*$ is a vector of samples at equalizer input, $e_k$ is an error value in a sequence of error values, $\mu$ is a white noise constant, and Q is a fictitious white noise shaping matrix; and stabilizing said algorithm for operation through a proper modification (I), comprising:
calculating a plurality of values ($I_i$) to be considered in updating said equalization coefficients ($c_{-L}, \ldots, c_L$);
wherein said plurality of values ($I_i$) are calculated successively in a single processing means (COMP) by using a subset of equalization coefficients ($c_{-L}, \ldots, c_L$) and a corresponding subset of shaping matrix coefficients ($q_{-N}, \ldots, q_N$), said plurality of values ($I_i$) being calculated successively and provided serially.

2. A method according to claim 1, further comprising the step of introducing said equalization coefficients ($c_{-L}, \ldots, c_L$) in parallel into said single processing means (COMP).

3. A method according to claim 2, further comprising evaluating each one of the plurality of values ($I_i$) in a distinct time instant, wherein said proper modification (I) is represented by a vector (I) of the plurality of values (I), and further comprising the step of updating said vector (I) in a determined interval (DT).

4. A method according to claim 3, wherein the determined interval (DT) to update said vector (I) is proportional to the number (2L+1) of delay taps (P) of the fractionally spaced equalizer (FSE) and to the number (2N+1) of the coefficients ($q_{-N}, \ldots, q_N$) of the fictitious white noise shaping matrix (Q).

5. A method according to claim 3, further comprising the step of obtaining said vector (I) at least from the product of said fictitious white noise shaping matrix (Q) by a vector (c) of the equalization coefficients ($c_{-L}, \ldots, c_L$).

6. A method according to claim 5, further comprising the steps of:
a) transmitting vector c of the equalization coefficients ($c_{-L}, \ldots, c_L$) to the processing means (COMP);
b) serializing an i-th subset ($c_{i-N}, \ldots, c_{i+N}$) in a first serial signal ($c_{ser}$);
c) serializing the coefficients ($q_{-N}, \ldots, q_N$) of the fictitious white noise shaping shaping matrix (Q) in a second serial signal ($q_{ser}$);
d) generating a product of the first serial signal ($c_{ser}$) and second serial signal ($q_{ser}$) in a third aerial signal ($c_q$) having 2N+1 values;
e) summing the 2N+1 values of the third serial signal ($c_q$) so as to obtain each one of the plurality of values ($I_i$) of the vector I;
f) transmitting the values ($I_i$) to the output of the processing means (COMP);
g) updating the index i; and
h) repeating steps b) to g) for $-L \leq i \leq L$.

7. A fractionally spaced equalizer for use in digital signal receivers, comprising:

a number of taps (P), the taps being associated with corresponding equalization coefficients ($c_{-L}, \ldots, c_L$);
a plurality of updating means (BA') for updating said equalization coefficients ($c_{-L}, \ldots, c_L$), said updating means, in cooperation with a single stabilizing means, implementing an algorithm $$c^{k+1} = c^k - \gamma(e_k r_k^* + \mu Q c^k)$$

based on the minimization of a proper cost function J of equalized samples and recognized values, wherein $c^{k+1}$ and $c^k$ with superscripts k+1 and k respectively, are each vectors having said equalization coefficients ($c_{-L}, \ldots, c_L$) as components but at different instants of time as indicated by the superscripts k+1 and k, $\gamma$ is a step chosen as a function of convergence rate, $r_k^*$ is a vector of samples at an equalizer input, $e_k$ is an error value in a sequence of error values, $\mu$ is a white noise constant, and Q is a fictitious white noise shaping matrix; and
the single stabilizing means (COMP) for calculating a plurality of values ($I_i$) to be considered in updating said equalization coefficients ($c_{-L}, \ldots, c_L$), said single stabilizing means (COMP) using a subset of equalization coefficients ($c_{-L}, \ldots, c_L$) and a corresponding subset of coefficients ($q_{-N}, \ldots, q_N$) of said fictitious white noise shaping matrix, said plurality of values ($I_i$) being serially transmitted to respective ones of said plurality of updating means (BA').

8. A fractionally spaced equalizer according to claim 7, characterized in that the stabilizing means (COMP) further comprises means for receiving the equalization coefficients ($c_{-L}, \ldots, c_L$) in parallel and outputting the plurality of values ($I_i$) in a serial manner, said plurality of values ($I_i$) providing a complete update of the plurality of values ($I_i$) in a determined time interval (DT), the plurality of updated values ($I_i$) forming a modification vector (I).

9. A fractionally spaced equalizer according to claim 8, wherein the determined time interval (DT) associated with the stabilizing means for updating the modification vector (I) of the proper cost function J is proportional to the number (2L+1) of delay taps (P) of the fractionally spaced equalizer (FSE) and to the number (2N+1) of the fictitious white noise shaping matrix (Q) coefficients ($q_{-N}, \ldots, q_N$).

10. A fractionally spaced equalizer according to claim 7, wherein the single stabilizing means (COMP) comprises a first multiplexer circuit (SEL) to receive the equalization coefficients ($c_{-L}, \ldots, C_L$) in parallel and to output a first serial signal ($c_{ser}$), a second multiplexer circuit (MUX2) that receives the coefficients ($q_{-N}, \ldots, q_N$) of the fictitious white noise shaping matrix (Q) and outputs a second serial signal ($q_{ser}$), a multiplier means (MX2) in cooperative engagement with the first and second multiplexer circuits for multiplying the second serial signal ($q_{ser}$) by the first serial signal ($c_{ser}$) and for outputting a third serial signal ($c_q$), an accumulator means (ACC) in cooperative engagement with the multiplier means for adding the symbols of the third serial signal ($c_q$), a decimation circuit (DEC), and a demultiplexer means (DEMUX) in cooperative engagement with the accumulator means for outputting the values ($I_i$) in a serial manner on parallel outputs.

11. A digital signal receiver comprising:
   a first sampler (CP1) for receiving a signal r(t) according to a period $T_M$ equal to a period T divided by a factor M and for outputting a first sampler output;
   a fractionally spaced equalizer (FSE) for receiving the output of the first sampler (CP1) and outputting a fractionally spaced equalizer output;
   a second sampler (CP2) for receiving the output of the fractionally spaced equalizer (FSE) and generating an equalized signal x(kT);
   an error calculation block (BE) in cooperative engagement with the output x(kr) of the second sampler (CP2) for generating an error signal $e_k$; and
   a decision block (MD) that also receives the equalized signal x(kT) and modifies this signal so as to form a recognized signal $â_k$;
   wherein the fractionally spaced equalizer comprises:
      a number of taps (P), the taps being associated with corresponding equalization coefficients ($c_{-L}, \ldots, c_L$);
      a plurality of updating means (BA') for updating respective ones of said equalization coefficients ($c_{-L}, \ldots, c_L$), said plurality of updating means, in cooperation with a single stabilizing means (COMP), implementing an algorithm $$c^{k+1} = c^k - \gamma(e_k r_k^* + \mu Q c^k)$$

based on the minimization of a proper cost function J of equalized samples and recognized values, wherein $c^{k+1}$ and $c^k$, with superscripts k+1 and k respectively, are each vectors having said equalization coefficients ($c_{-L}, \ldots, c_L$) as components but at different instants of time as indicated by the superscripts k+1 and k, $\gamma$ is a step chosen as a function of convergence rate, $r_k$ is a vector of samples at equalizer input, $e_k$ is an error value in a sequence of error values, $\mu$ is a white noise constant, and Q is a fictitious white noise shaping matrix; and
      the single stabilizing means (COMP) for calculating a plurality of values ($I_i$) to be considered in updating said equalization coefficients ($c_{-L}, \ldots, c_L$), said single stabilizing means (COMP) using a subset of equalization coefficients ($c_{-L}, \ldots, c_L$) and a corresponding subset of coefficients ($q_{-N}, \ldots, q_N$) of said fictitious white noise shaping matrix, said plurality of values ($I_i$) being serially transmitted to respective ones of said plurality of updating means (BA').

* * * * *